(12) United States Patent
Sun et al.

(10) Patent No.: US 7,924,687 B2
(45) Date of Patent: Apr. 12, 2011

(54) OPTICAL SYSTEM FOR COLLIMATING ELLIPTICAL LIGHT BEAM AND OPTICAL DEVICE USING THE SAME

(75) Inventors: Wen-Hsin Sun, Fullerton, CA (US); Wen-Ssu Chiu, Fullerton, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1456 days.

(21) Appl. No.: 11/322,092

(22) Filed: Dec. 29, 2005

(65) Prior Publication Data
US 2006/0209293 A1 Sep. 21, 2006

(30) Foreign Application Priority Data
Mar. 18, 2005 (CN) .......................... 2005 1 0033734

(51) Int. Cl.
*G11B 7/00* (2006.01)
(52) U.S. Cl. .................................. 369/112.24
(58) Field of Classification Search ............. 369/112.24, 369/44.23, 112.01
See application file for complete search history.

(56) References Cited

U.S. PATENT DOCUMENTS

| | | | | |
|---|---|---|---|---|
| 5,155,714 A | * | 10/1992 | Inoue | 369/13.02 |
| 5,237,451 A | * | 8/1993 | Saxe | 359/565 |
| 5,251,060 A | * | 10/1993 | Uenishi et al. | 359/328 |
| 5,486,694 A | * | 1/1996 | Harris | 250/236 |
| 2004/0085884 A1 | * | 5/2004 | Kimura | 369/112.24 |

FOREIGN PATENT DOCUMENTS
TW 591631 6/2004
* cited by examiner

*Primary Examiner* — Thang V Tran
*Assistant Examiner* — Dionne H Pendleton
(74) *Attorney, Agent, or Firm* — Clifford O. Chi

(57) ABSTRACT

An optical system (20) for efficiently collimating an elliptical light beam includes a light source (21), a first lens (22), a second lens (23), and a third lens (24). The light source is adapted for providing an elliptical light beam defining different diverging angles in different directions, wherein any cross-section of the elliptical light beam emitted from the light source defines a long axis and a short axis which are perpendicular to each other. The first lens, the second lens, and the third lens are used for reconfiguring the elliptical light beam, thus obtaining a round light beam having equivalent short axis and long axis, and equivalent diverging angles in both horizontal direction and vertical direction. Optical centers of the first lens, the second lens, and the third lens commonly define a common optical axis along which the elliptical light beams travels.

16 Claims, 3 Drawing Sheets

OPTICAL SYSTEM FOR COLLIMATING ELLIPTICAL LIGHT BEAM AND OPTICAL DEVICE USING THE SAME

BACKGROUND OF THE PRESENT INVENTION

1. Field of the Invention

The present invention relates to an optical system for collimating an elliptical light beam, and particularly to an optical system for efficiently collimating elliptical light beams emitted from a side light emitting laser diode and an optical device using the same.

2. Related Art

Optical disks are widely used data store media, and are being developed to store more information than previously. Since higher data storing density is demanded of optical disks, optical disk reading/writing systems correspondingly need to be more precise and sophisticated.

Referring to FIG. 1, a conventional optical device 10 for providing a collimated parallel round light beam for reading/writing to an optical disk is shown. The optical device 10 includes a light source 110, an optical holographic element 120, a round collimating lens 130, a reflective mirror 140, an object mirror 150, and an optoelectronic detector 160. In operation, the light source 110 provides a light beam of a certain wavelength. The light beam reaches and passes through the optical holographic element 120, and thereafter is collimated by the collimating lens 130 into a parallel light beam. The parallel light beam is then reflected by the reflective mirror 140 to the object mirror 150. The object mirror 150 converges the parallel light beam to a recording layer 170 of an optical disk (not labeled). The light beam converged to the recording layer 170 is modulated in accordance with the data recorded thereon or written thereon, and is then reflected by the optical disk back to the object mirror 150. The light is then transmitted back to the optical holographic element 120 along the above-described input path. The optical holographic element 120 is adapted for deviating light beams that pass therethrough in the return direction. Therefore, the light beam is transmitted to and detected by the optoelectronic detector 160, rather than being transmitted to the light source 110. According to the light beam received, the optoelectronic detector 160 outputs an electronic signal, from which the information recorded on or written to the optical disk can be interpreted or identified.

A typical optical system adopts a side light emitting laser diode as a light source. Referring to FIG. 2, such a side light emitting laser diode 9 has a rectangular waveguide type resonation cavity. The laser light beam emitted from the resonation cavity has different diverging angles in horizontal directions and vertical directions respectively, and thus provides an elliptical light beam. Typically, the horizontal diverging angle is about ±10° and the vertical diverging angle is about ±30°. An elliptical light beam has to be intercepted or converted to a round light beam for use in the optical system.

In the above-described optical device 10, the round collimating lens 130 is employed for intercepting a round core part of the elliptical light beam and thus obtaining a round light beam. The collimating lens 130 generally has a diameter shorter than a corresponding short (e.g., horizontal) axis of a light spot projected by the elliptical light beam incident thereon. The core part of the elliptical light beam is allowed to pass through the round collimating lens 130, and the peripheral part of the elliptical light beam is dissipated. Referring to FIG. 3, this is a graph of a relationship between diverging angles of the elliptical light beam output by the side light emitting laser diode (X-axis) and intensity of light output by the collimating lens 130 (Y-axis). Various different horizontal diverging angles are collectively shown as the line $\theta_H$, and various different vertical diverging angles are collectively shown as the line $\theta_V$. The space between any two horizontally opposite points on the line $\theta_H$ represents the round core part of the elliptical light beam that is intercepted by the round collimating lens 130. The horizontal space between each such point and the corresponding point on the line $\theta_V$ represents a peripheral part of the elliptical light beam that is dissipated. As seen in FIG. 3, even if the round collimating lens 130 intercepts the elliptical light beam with a minimal amount of loss of light intensity (i.e. when both of the diverging angles are small), the amount of loss of light intensity is still quite large. Therefore, in general, a side light emitting laser diode with high power is needed to compensate for the loss of light intensity. However, high-power laser diodes are not only more costly, but also consume more power.

Therefore, what is needed is an optical system for efficiently collimating an elliptical light beam.

SUMMARY

An exemplary embodiment of the present optical system is for efficiently collimating an elliptical light beam and providing a substantially round light beam for reading/writing to an optical disk.

The optical system includes a light source, a first lens, and a second lens arranged in that sequence. The light source is adapted for providing an elliptical light beam defining different diverging angles in different directions. In particular, any cross-section of the elliptical light beam emitted from the light source defines a long axis and a short axis, which are perpendicular to each other. The first lens is adapted for diverging the elliptical light beam and enlarging the short axis so as to narrow a difference between the long axis and the short axis when the light beam passes therethough. The second lens is for converging the elliptical light beam and adjusting the short axis, thus obtaining a round light beam. A common optical axis is defined by the optical centers of the first lens and the second lens, and the elliptical light beams travels along the common optical axis.

An advantage of the optical system is that it can efficiently collimate the elliptical light beam emitting from the light source.

Another advantage is that a light source of relatively low power can be used in the optical system.

BRIEF DESCRIPTION OF THE DRAWINGS

The above-mentioned and other features and advantages of the optical system, and the manner of attaining them, will become more apparent and the invention will be better understood by reference to the following description of embodiments thereof taken in conjunction with the accompanying drawings.

Figure 1:
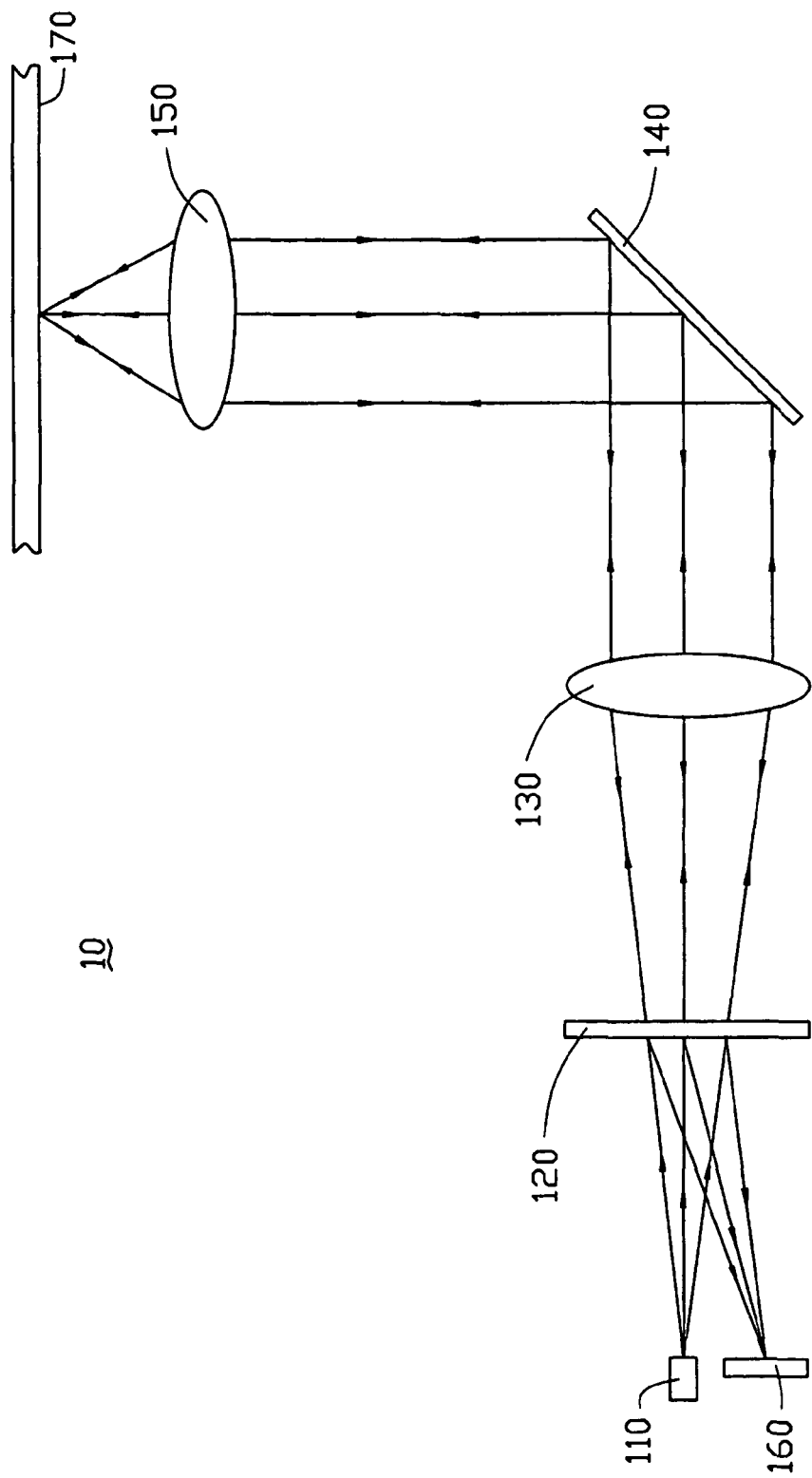
FIG. 1 is a schematic, front view of a conventional optical device for reading/writing to an optical disk, and also showing part of an optical disk and essential optical paths.
Figure 2:
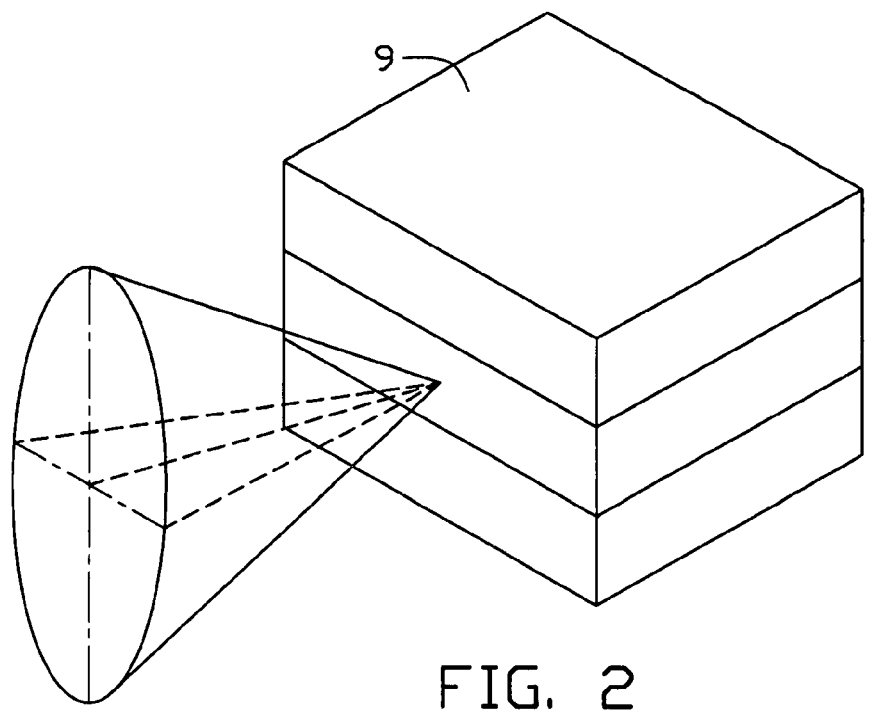
FIG. 2 is an enlarged, isometric view of a conventional light emitting laser diode, showing a diverging path of a light beam emitted therefrom.
Figure 3:
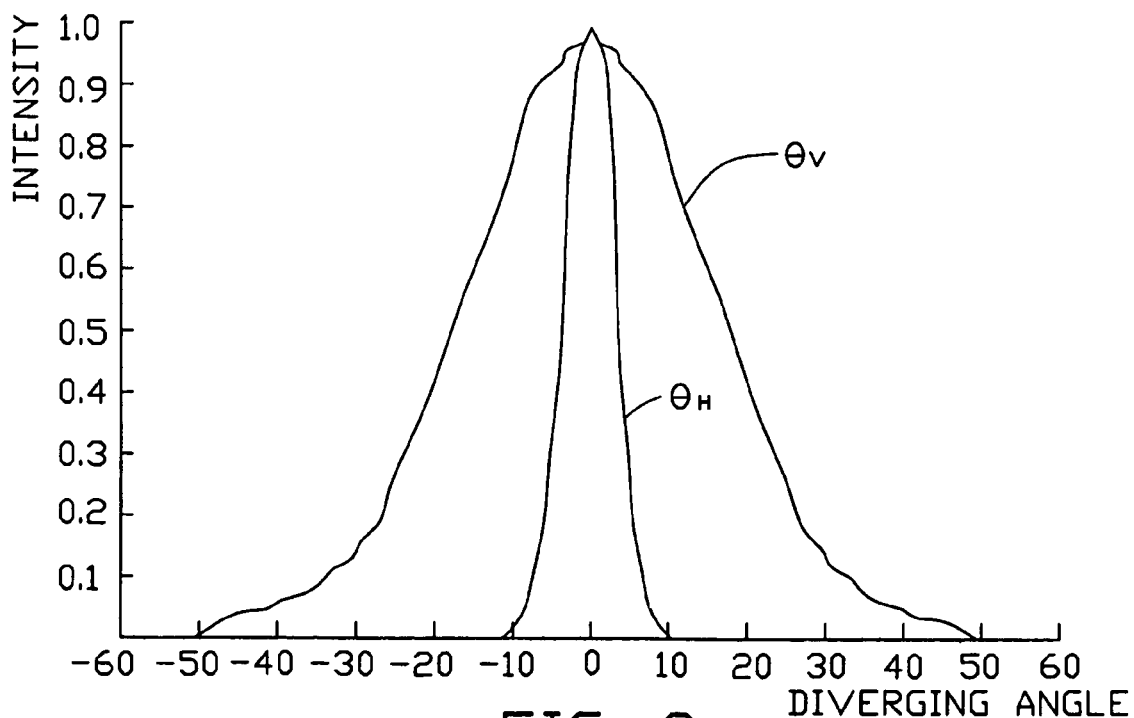
FIG. 3 is a graph showing a relationship between diverging angles of light emitted by a light emitting laser diode of the optical device of FIG. 1 (X-axis) versus light intensity output by a round collimating lens of the optical device (Y-axis).

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Reference will now be made to the drawings to describe in detail the preferred embodiments of the present optical system and an optical device using the same.

Figure 4:
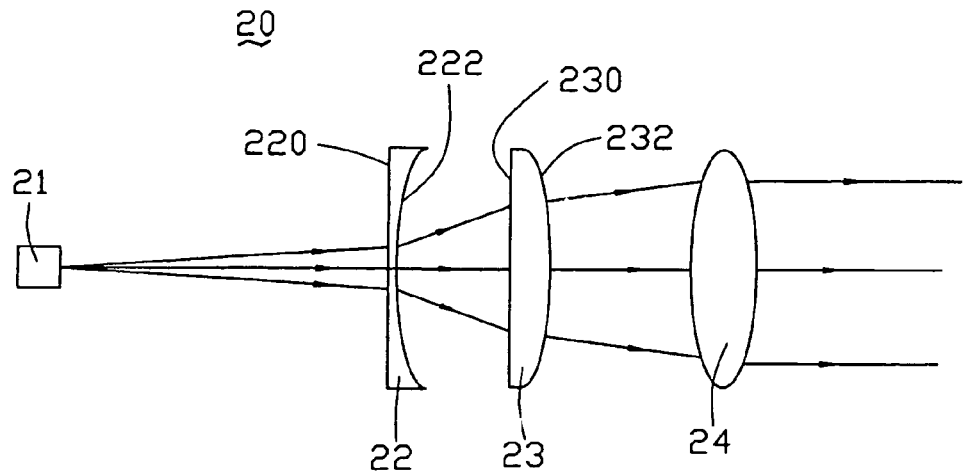
FIG. 4 is a schematic, top view of an optical system for collimating elliptical light beams according to an exemplary embodiment of the present invention, showing essential optical paths thereof.

Referring to FIG. 4, this is a schematic, top view mainly of an optical system 20 for collimating elliptical light beams according to an exemplary embodiment of the present invention. The optical system 20 includes a light source 21, a first lens 22, a second lens 23, and a third lens 24 arranged in that sequence. The light source 21 is adapted for emitting an elliptical light beam along a path coinciding with optical centers of the first lens 22, the second lens 23 and the third lens 24. Any cross-section of the elliptical light beam emitted from the light source 21 defines a long axis and a short axis, which are perpendicular to each other. The elliptical light beam also defines different diverging angles in different directions. In the illustrated embodiment, the maximum diverging angle is in a vertical direction and the minimum diverging angle is in a horizontal direction. Thus in FIG. 4, the long axis is perpendicular to the page, and the short axis is coplanar with the page.

The first lens 22 has two surfaces 220, 222 opposite to each other. At least one of the two surfaces 220 and 222 is a concave surface having a particular concavity, and the other of the two surfaces 220 and 222 is less concave. In the illustrated embodiment, the surface 222 is a concave surface, and the surface 220 is a flat surface. In other embodiments, the surface 220 can be either a concave surface or a convex surface. Thus the first lens 22 substantially functions as a diverging lens in horizontal directions. The second lens 23 has two surfaces 230 and 232 opposite to each other. At least one of the two surfaces 230 and 232 is a convex surface having a particular convexity, and the other of the two surfaces 230 and 232 is less convex. In the illustrated embodiment, the surface 232 is a convex surface, and the surface 230 is a flat surface. In other embodiments, the surface 230 can be either a convex surface or a concave surface. Thus the second lens 23 substantially functions as a converging lens in horizontal directions. The third lens 24 is a round lens adapted for converting the light outputted from the second lens 23 into a parallel light beam.

In use, the light source 21 emits an elliptical light beam having a short axis configured in horizontal directions coplanar with the page of FIG. 4. The first lens 22 diverges the elliptical light beam and enlarges the short axis and/or the diverging angle in horizontal directions of the elliptical light beam. Thus when the diverged elliptical light beam reaches the second lens 23, a difference between the short axis and the long axis is narrowed. Meanwhile a difference between diverging angles of the elliptical light beam respectively in the horizontal directions and the vertical directions is narrowed. The second lens 23 converges the elliptical light beam and adjusts the short axis and/or the diverging angle in horizontal directions, thus providing a light beam having substantially round cross-sections and diverging angles approaching zero. The round light beam outputted from the second lens 23 is then converged by the third lens 24 into a substantially parallel round light beam, for further use in a reading/writing operation.

The light source 21 is a side light emitting laser diode which has a rectangular waveguide type resonation cavity (not shown), from which the elliptical light beam can be emitted. According to the exemplary embodiment, the first lens 22, the second lens 23 and the third lens 24 advantageously have a common optical axis, along which the elliptical light beam emitted from the light source 21 is transmitted. The precise positions of the light source 21, the first lens 22, the second lens 23 and the third lens 24 relative to each other are determined according to need. For example, the optical system 20 may be structured so that the positions of any of lenses 22, 23 and 24 can be adjusted as required. That is, the positions of the lenses 22, 23 and 24 can be adjustable along the common optical axis. Thereby, the obtained parallel round light beam is tunable according to the requirements of any desired application.

In summary, the optical system 20 is adapted for efficiently utilizing the light energy of a side light emitting laser diode. Thus in the exemplary embodiment, the efficiency of utilization of light emitted by the light source 21 is improved.

Figure 5:
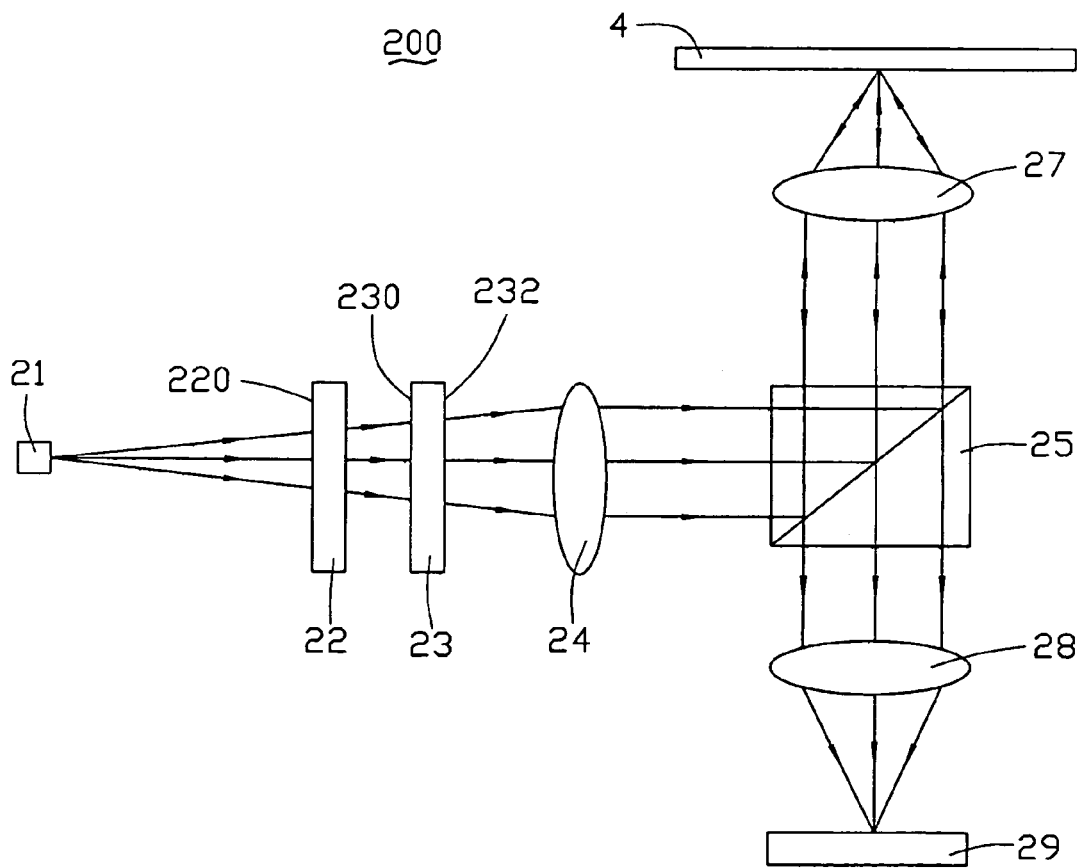
FIG. 5 is a schematic, front view of an optical device for reading/writing to an optical disk, the optical device employing the optical system of FIG. 4, and also showing an optical disk and essential optical paths.

An exemplary optical device 200 employing the optical system 20 is shown in FIG. 5. The optical device 200 is for reading/writing to an optical disk 4. The optical device 200 includes the optical system 20, a semi-reflective mirror 25, an object lens 27, a collimator 28, and an optoelectronic detector 29.

In operation, the optical system 20 provides a collimated parallel round light beam to the semi-reflective mirror 25. The semi-reflective mirror 25 then reflects the light beam to the object lens 27. The object lens 27 focuses the parallel light beam to a point on the optical disk 4, for reading data therefrom and/or writing data thereto. The light beam is modulated by the optical disk 4 according to the data recorded or the data to be written thereto, and then is reflected back to the object lens 27. The object lens 27 converts the light beam into a parallel light beam corresponding to information read from or written to the optical disk 4. The parallel light beam passes through the semi-reflective mirror 25, and is then focused by the collimator 28 onto the optoelectronic detector 29. The optoelectronic detector 29 is adapted for detecting information from the light beam received, converting such information into electronic signals, and outputting the electronic signals.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. An optical system for efficiently collimating elliptical light beams, comprising:
   a light source, adapted for providing an elliptical light beam defining different diverging angles in different directions, wherein any cross-section of the elliptical light beam emitted from the light source defines a long axis and a short axis which are perpendicular to each other;
   a first lens, functioning as a diverging lens in directions corresponding to the short axis, for diverging the elliptical light beam and enlarging the short axis so as to narrow a difference between the long axis and the short axis and to narrow a difference between a diverging angle corresponding to the short axis and a diverging angle corresponding to the long axis, when the elliptical light beam passes therethrough;
   a second lens, functioning as a converging lens in the directions corresponding to the short axis, for converging the elliptical light beam and adjusting the short axis in order to obtain a round light beam when the elliptical light beam passes through the second lens; and
   a third lens for converging the round light beam into a substantially parallel round light beam;
   wherein the optical centers of the first lens and the second lens commonly define a common optical axis along which the elliptical light beam travels, the light source and the first lens are arranged with no intervening lenses therebetween, and an optical center of the third lens coincides with the common optical axis.

2. The optical system as described in claim 1, wherein the relative positions of the light source, the first lens, the second lens, and the third lens are adjustable along the common optical axis.

3. The optical system as described in claim 1, wherein the light source, the first lens, the second lens, and the third lens are arranged in that order.

4. The optical system as described in claim 1, wherein the light source is a side light emitting laser diode.

5. The optical system as described in claim 1, wherein the first lens comprises a first surface and a second surface opposite to each other, and at least one of the first and second surfaces is a concave surface.

6. The optical system as described in claim 1, wherein the second lens comprises a first surface and a second surface opposite to each other, and at least one of the first and second surfaces is a convex surface.

7. An optical device for reading/writing to an optical disk, comprising:
   an optical system comprising:
      a light source, adapted for providing an elliptical light beam defining different diverging angles in different directions, wherein any cross-section of the elliptical light beam emitted from the light source defines a long axis and a short axis which are perpendicular to each other;
      a first lens, functioning as a diverging lens in directions corresponding to the short axis, for diverging the elliptical light beam and enlarging the short axis so as to narrow a difference between the long axis and the short axis and to narrow a difference between a diverging angle corresponding to the short axis and a diverging angle corresponding to the long axis, when the elliptical light beam passes therethrough, the light source and the first lens being arranged with no intervening lenses therebetween;
      a second lens, functioning as a converging lens in the directions corresponding to the short axis, for converging the elliptical light beam and adjusting the short axis in order to obtain a round light beam; and
      a third lens for converging the round light beam into a substantially parallel round light beam;
      wherein optical centers of the first lens, the second lens, and the third lens commonly define a common optical axis along which the elliptical light beam travels;
   a semi-reflective mirror, for allowing light beams from a first direction to pass therethrough and for reflecting light beams from a second direction, the second direction being substantially perpendicular to the first direction, the common optical axis being located along the second direction;
   an object lens for focusing parallel light beams to a point on an optical disk;
   a collimator arranged along the first direction for collimating light beams passing therethrough from the first direction; and
   an optoelectronic detector, for receiving the collimated light beams, detecting information from the collimated light beams, converting the information into electronic signals, and outputting the electronic signals.

8. The optical device as described in claim 7, wherein the light source is a side light emitting laser diode.

9. The optical device as described in claim 7, wherein the first lens comprises a first surface and a second surface opposite to each other, and at least one of the first and second surfaces is a concave surface.

10. The optical device as described in claim 7, wherein the second lens comprises a first surface and a second surface opposite to each other, and at least one of the first and second surfaces is a convex surface.

11. An optical system for efficiently collimating elliptical light beams, comprising:
    a light source, adapted for providing an elliptical light beam defining different diverging angles in different directions, wherein any cross-section of the elliptical light beam emitted from the light source defines a long axis and a short axis which are perpendicular to each other;
    a first lens, functioning as a diverging lens in directions corresponding to the short axis, for diverging the elliptical light beam and enlarging the short axis so as to narrow a difference between the long axis and the short axis and to narrow a difference between a diverging angle corresponding to the short axis and a diverging angle corresponding to the long axis, when the elliptical light beam passes therethrough; and
    a second lens, functioning as a converging lens in the directions corresponding to the short axis, for converging the elliptical light beam and adjusting the short axis in order to obtain a round light beam; and
    a third lens for converging the round light beam into a substantially parallel round light beam;
    wherein the optical centers of the first lens and the second lens commonly define a common optical axis along which the elliptical light beams travels, the light source and the first lens are arranged with no intervening lenses therebetween, and an optical center of the third lens coincides with the common optical axis.

12. The optical system as described in claim 11, wherein the relative positions of the light source, the first lens, the second lens, and the third lens are adjustable along the common optical axis.

13. The optical system as described in claim 11, wherein the light source, the first lens, the second lens, and the third lens are arranged in that order.

14. The optical system as described in claim 11, wherein the light source is a side light emitting laser diode.

15. The optical system as described in claim 11, wherein the first lens comprises a first surface and a second surface opposite to each other, and at least one of the first and second surfaces is a concave surface.

16. The optical system as described in claim 11, wherein the second lens comprises a first surface and a second surface opposite to each other, and at least one of the first and second surfaces is a convex surface.

* * * * *